(12) United States Patent
Yoon et al.

(10) Patent No.: US 10,263,438 B2
(45) Date of Patent: Apr. 16, 2019

(54) BATTERY MANAGEMENT SYSTEM FOR VEHICLE

(71) Applicant: HYUNDAI MOTOR COMPANY, Seoul (KR)

(72) Inventors: Jong Hu Yoon, Hampyeong-gun (KR); Mi Ok Kim, Seongnam-si (KR); Kyung In Min, Seongnam-si (KR); Do Sung Hwang, Gunpo-si (KR); Jae Hoon Choi, Gunpo-si (KR); Kyung Ho Kim, Ansan-si (KR); Beom Gyu Kim, Hwaseong-si (KR); Hee Tae Yang, Seoul (KR); Yu Seok Kim, Seoul (KR); Hyo Sik Moon, Hwaseong-si (KR); Suk Hyung Kim, Gunpo-si (KR); Beom Joo Kwon, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 206 days.

(21) Appl. No.: 15/376,575

(22) Filed: Dec. 12, 2016

(65) Prior Publication Data

US 2018/0013297 A1 Jan. 11, 2018

(30) Foreign Application Priority Data

Jul. 11, 2016 (KR) .................. 10-2016-0087361

(51) Int. Cl.
*H02J 7/00* (2006.01)
*B60R 16/04* (2006.01)
(Continued)

(52) U.S. Cl.
CPC .......... *H02J 7/0029* (2013.01); *B60R 16/033* (2013.01); *B60R 16/04* (2013.01);
(Continued)

(58) Field of Classification Search
CPC .... H02J 7/0029; H02J 7/007; H02J 2007/004; H02J 2007/003; B60R 16/033; B60R 16/04
See application file for complete search history.

(56) References Cited

U.S. PATENT DOCUMENTS 5,635,804 A * 6/1997 Tanaka ............... B60L 11/1803
                                                    318/139
5,670,934 A * 9/1997 Ina ......................... B60R 25/00
                                                    180/287
(Continued)

FOREIGN PATENT DOCUMENTS

JP  2004-203178 A   7/2004
JP  2008-309041 A  12/2008
(Continued)

*Primary Examiner* — Daniel Kessie
*Assistant Examiner* — Terrence R Willoughby
(74) *Attorney, Agent, or Firm* — McDonnell Boehnen Hulbert & Berghoff LLP

(57) ABSTRACT

A battery management system for a vehicle is provided. The system is capable of preventing vehicle malfunction by preventing overcharge and over-discharge of a low-voltage battery by providing a controller that is configured to receive power transmitted from a first connection line and power transmitted from a second connection line. The battery management system includes a relay configured to electrically connect and disconnect power that is supplied from a battery to loads. The system also includes a controller configured to receive a first regular power transmitted through a connection line between the battery and the relay and a second regular power transmitted through a connection line between the relay and the loads. The controller is further configured to turn the relay on and off.

5 Claims, 3 Drawing Sheets

(51) Int. Cl.
 *B60R 16/033* (2006.01)
 *H02J 7/14* (2006.01)
(52) U.S. Cl.
 CPC ............. *H02J 7/007* (2013.01); *H02J 7/14* (2013.01); *H02J 2007/004* (2013.01); *H02J 2007/0037* (2013.01)

(56) References Cited

U.S. PATENT DOCUMENTS

| | | | | |
|---|---|---|---|---|
| 5,796,175 | A * | 8/1998 | Itoh | B60L 3/0023 307/10.1 |
| 6,838,783 | B2 * | 1/2005 | Stierle | F02D 41/3005 307/10.1 |
| 2004/0066168 | A1 | 4/2004 | George et al. | |
| 2006/0097577 | A1 * | 5/2006 | Kato | F02N 11/0866 307/10.1 |
| 2011/0288705 | A1 | 11/2011 | Kawasaki et al. | |
| 2015/0357864 | A1 * | 12/2015 | Gofman | H02J 7/0045 307/66 |
| 2016/0082854 | A1 | 3/2016 | Richardson et al. | |

FOREIGN PATENT DOCUMENTS

| | | |
|---|---|---|
| JP | 2012-152003 A | 8/2012 |
| JP | 2014-187731 A | 10/2014 |
| JP | 2015-173589 A | 10/2015 |
| KR | 10-2001-0111135 A | 12/2001 |
| KR | 10-2011-0081098 A | 7/2011 |
| KR | 10-2012-0136828 A | 12/2012 |
| KR | 10-2013-0078099 A | 7/2013 |
| KR | 10-1315645 B | 10/2013 |

\* cited by examiner

BATTERY MANAGEMENT SYSTEM FOR VEHICLE

CROSS REFERENCE TO RELATED APPLICATION

The present application claims the benefit of priority under 35 U.S.C. § 119(a) to Korean Patent Application No. 10-2016-0087361, filed Jul. 11, 2016, the entire contents of which are incorporated herein by reference.

BACKGROUND

Technical Field

The present disclosure relates to a battery management system for a vehicle and, more particularly, to a battery management system that (i) can prevent malfunction of a vehicle by preventing overcharge and over-discharge of a low-voltage battery using a controller that receives power transmitted from a first connection line and power transmitted from a second connection line and (ii) allows a jumpstart of a vehicle using external power under various circumstances.

Description of the Related Art

An environmentally-friendly vehicle, such as an electric vehicle or a fuel cell vehicle, is typically equipped with a low-voltage battery (also referred to herein as an "auxiliary battery") for supplying power for starting the vehicle and supplying power to electric loads that are operated at a low voltage. Vehicles equipped with internal combustion engines that operate on fossil fuel are also equipped with chargeable batteries for starting the vehicles or supplying power to electric loads.

Lead acid batteries are commonly used for such low-voltage batteries due to the relatively low cost of such batteries. However, it is likely that lead-acid batteries will be replaced by lithium batteries, as lithium batteries have both a long lifespan and excellent electrical properties.

Fully discharging lithium batteries should be avoided due to the characteristics of the lithium batteries. Therefore, existing auxiliary battery systems include a relay configured to electrically disconnect an auxiliary battery from a vehicle system when the auxiliary battery is discharged below a predetermined critical voltage (i.e., low limit discharge voltage). An auxiliary battery system including a lithium battery and a relay should be appropriately controlled in a variety of situations. Therefore, auxiliary battery systems are typically managed by a specific controller, such as a controller in an automotive battery management system.

In existing systems, controllers for battery management systems are usually supplied with power for operation directly from the battery. That is, such controllers are supplied with power directly from a connection line between the auxiliary battery and the relay.

In such a power supply structure for these typical controllers, when the voltage of an auxiliary battery is discharged below a level at which the controller can operate, the controller is unable to operate. An example problem with such existing controllers is that when a relay is turned off and the controller cannot be supplied with power due to excessive discharge of the battery, it is not possible to turn the relay on again. In this situation, the controller is unable to operate, and even a jump start using external power is not possible.

Unless otherwise indicated herein, the materials described above in this section are not prior art to the claims and are not admitted to be prior art by inclusion in this section.

SUMMARY OF THE DISCLOSURE

An object of the present disclosure is to provide an improved battery management system for a vehicle. The disclosed system is capable of preventing vehicle malfunction by preventing overcharge and over-discharge of a low-voltage battery by using a controller that is configured to receive power transmitted from a first connection line as well as power transmitted from a second connection line. The disclosed system is also capable of allowing a jumpstart of a vehicle using external power under various circumstances.

In accordance with an example embodiment of the present disclosure, a battery management system for a vehicle includes a relay configured to electrically connect and disconnect power supplied from a battery to at least one load. The system further includes a controller configured to be operated by receiving (i) a first regular power transmitted through a connection line between the battery and the relay and (ii) a second regular power transmitted through a connection line between the relay and the loads. The controller is further configured to turn the relay on and off.

In an example embodiment, the controller receives the first regular power and the second regular power through a common supply line.

In another example embodiment, the controller receives the first regular power and the second regular power through separate supply lines.

When the voltage of the battery falls below a predetermined level and the relay is turned off, the controller may be operated by receiving the second regular power. In such a situation, the second regular power may be provided by external power applied to the connection line between the relay and the at least one load.

In an example embodiment, the system also includes a reconnection switch, the connection state of which is determined or controlled by an input provided by a user. The reconnection switch may generate signals for turning the relay on and off in accordance with the connection state. Further, the controller may turn the relay on and off based on the connection state of the reconnection switch.

In an example embodiment, the controller may be woken up under various circumstances. For example, the controller wakes up upon receiving a connection signal from the reconnection switch. As another example, the controller wakes up upon receiving an accessory-on (ACC-on) signal or an ignition-on (IGI-on) signal provided in response to the input of a key into a vehicle. As yet another example, the controller wakes up when an overvoltage is applied to the connection line between the relay and the loads.

In an example embodiment, the controller may turn the relay on and off by providing control signals having pulse waveforms to the relay based on the connection state of the reconnection switch.

In accordance with another example embodiment, a battery management system for a vehicle includes a relay configured to electrically connect and disconnect power supplied from a battery to at least one load. The system further includes a controller configured to be operated by (i) a first regular power transmitted through a connection line between the battery and the relay and (ii) a second regular power transmitted through a connection line between the relay and the loads. The controller is further configured to turn the relay on and off. The system further includes a reconnection switch, a connection state of which is determined by an input provided by a user. The reconnection switch is configured to generate and provide signals for turning the relay on and off to a controller based on the connection state. In this example embodiment, the first regular power is provided to the controller through the reconnection switch.

In this example embodiment, the controller receives the first regular power when the reconnection switch is connected, and the controller receives the second regular power when the reconnection switch is disconnected.

The controller may be woken up under various circumstances. For example, the controller wakes up in response to receiving a connection signal of the reconnection switch. In another example, the controller wakes up in response to receiving an ACC-on signal or an IGI-on signal provided by a key input in a vehicle. In yet another example, the controller wakes up when an overvoltage is applied to the connection line between the relay and the loads.

When the reconnection switch is connected, the relay is turned off, and the voltage of the battery is over a predetermined level, the controller may be woken up by the voltage of the battery transmitted through the reconnection switch. The controller may then turn on the relay by receiving the voltage of the battery as the first regular power while the reconnection switch remains in the connection state.

On the other hand, the controller may be operated by the second regular power when the relay is turned on and the reconnection switch is disconnected.

As described above, in accordance with an example battery management system of the present disclosure, a controller receives power from both the front end and the rear end of a relay. Therefore, even if the battery is discharged to a level at which the controller can no longer be operated by the battery, the controller is still capable of being operated by regular power received from an external power source connected to the rear end of the relay (e.g., power provided to jumpstart the vehicle).

Therefore, in the disclosed battery management system, it is not only possible to prevent battery overcharge and over-discharge by controlling a relay, but it is always possible to perform a jump start of a vehicle using external power even when the battery is over-discharged. The disclosed battery management system may thus improve the commercial value of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Battery management systems for a vehicle according to example embodiments of the present disclosure are described hereafter with reference to the accompanying drawings.

Figure 1:
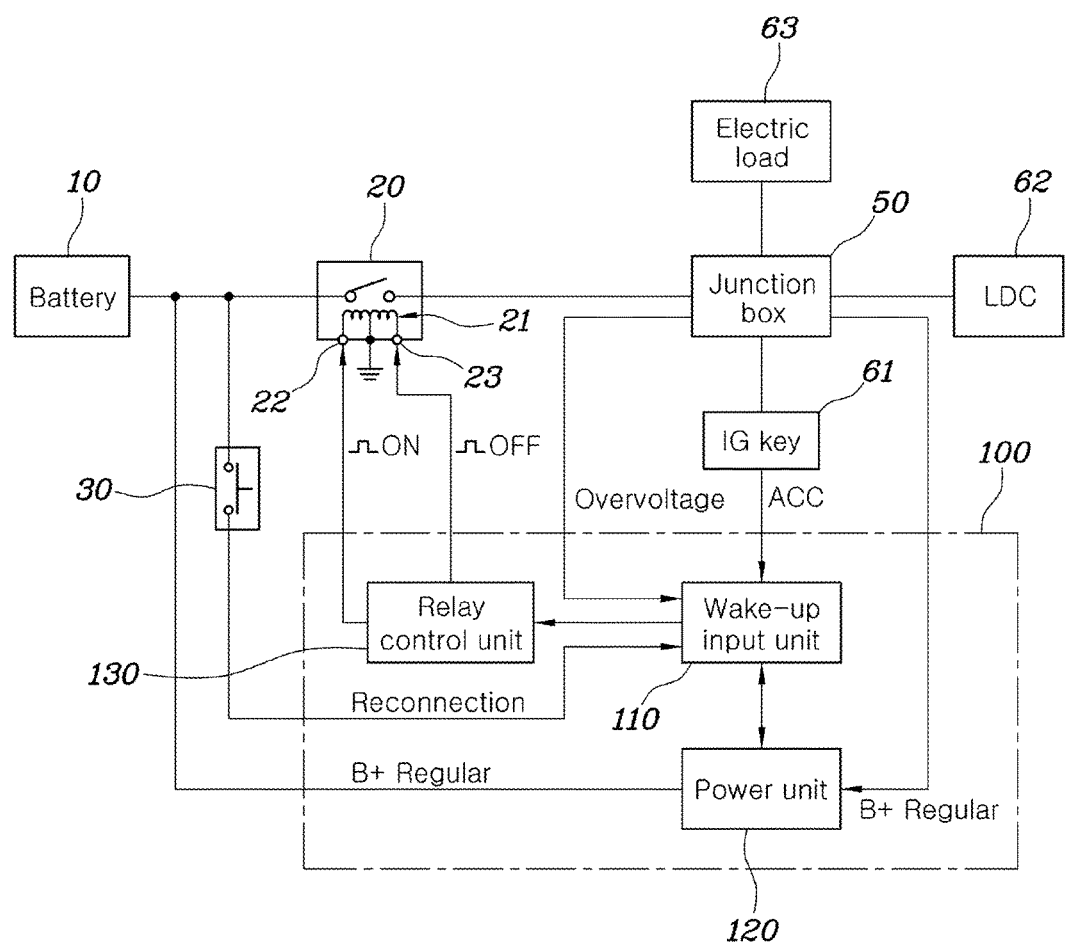
FIG. 1 is a block diagram illustrating a battery management system for a vehicle according to an example embodiment of the present disclosure.

FIG. 1 is a block diagram illustrating an example battery management system for a vehicle according to an example embodiment of the present disclosure.

Referring to FIG. 1, an example battery management system according to an embodiment of the present disclosure includes a battery 10, a relay 20, and a controller 100. The relay 20 has a first end (referred to herein as "the front end") that is connected to the battery 10 and a second end (referred to herein as "the rear end") that is electrically connected to or disconnected from the front end in response to electrical signals. The controller 100 is configured to turn the relay 20 on and off.

The battery management system further includes a reconnection switch 30 having a first end that is connected to the battery and a second end that can be electrically connected to or disconnected from the first end in response to an external input. In an example, the external input is an input provided by a user of the vehicle.

The battery 10 may be any suitable component that stores electric energy for outputting power. In an example, the battery 10 outputs low-voltage power, such as approximately 12V. Other voltages are possible as well. The battery 10 can supply power to various loads that operate when a vehicle is started. In an example, battery 10 may also supply power for a low-voltage load while the vehicle runs.

In example embodiments of the present disclosure, when the battery 10 provided in an environment-friendly vehicle in which a motor is operated by high-voltage power (e.g., an electric vehicle or fuel cell vehicle), battery 10 may be referred to as a "low-voltage battery" or an "auxiliary battery." This terminology helps to distinguish battery 10 from a high-voltage battery for operating the motor. In another example, battery 10 is a battery provided in a vehicle equipped with an internal combustion engine.

In a particular example, battery 10 is a lead acid battery or a lithium battery. Although lead acid batteries are commonly used due to their low cost, lead acid batteries are now often being replaced by lithium batteries given the high reliability and a long lifespan of lithium batteries.

However, the performance of lithium batteries rapidly deteriorates when the batteries are discharged below a predetermined level. Therefore, the relay 20 is provided for when the voltage drops under the predetermined voltage. Although example embodiments of the present disclosure are described with reference to vehicles equipped with a lithium battery as the battery 10, it should be understood that the battery 10 is not limited thereto. For instance, the disclosed embodiments can also be applied to the case where battery 10 is a lead acid battery or another type of battery.

The relay 20 is a component that provides an electrical connection or disconnection between the battery 10 and the vehicle system. As shown in FIG. 1, the relay 20 has a front end electrically connected to the battery 10 and a rear end connected to the vehicle system. Relay 20 can affect the electric connection between the battery 10 and the vehicle system by electrically connecting or disconnecting the front end and the rear end.

The relay 20 is turned on/off in response to external control signals. For example, when a control signal having a specific voltage is applied to a first end 22 of a coil 21 in the relay 20 to turn on the relay, the front end and rear end of the relay 20 are electrically connected. Further, when a control signal having a specific voltage is applied to a second end 23 of the coil 21 in the relay 20 to turn off the relay 20, the front end and the rear end of the relay 20 are electrically disconnected. In an example, the relay 20 includes two control signal input terminals 22 and 23. As seen in FIG. 1, input terminal 22 receives a control signal for turning the relay 20 on and input terminal 23 receives a control signal for turning the relay 20 off.

In an example embodiment, when the battery 10 is operated under normal conditions (e.g., when the battery 10 has a voltage between a predetermined upper limit voltage and a predetermined lower limit voltage), the relay 20 can be kept connected (i.e., turned on). On the other hand, when the battery 10 has a voltage lower than a predetermined critical value (e.g., lower limit voltage), the relay 20 can be disconnected (i.e., turned off). By doing so, the relay 20 can help prevent malfunction of a vehicle by preventing overcharge and over-discharge of the low-voltage battery 10. The controller 100 provides the control signals for turning the relay 20 on and off.

The reconnection switch 30 is a component for receiving input to reconnect (i.e., turn on) the relay 20 that has been turned off. The reconnection switch 30 may have two ends that are electrically connected to or disconnected from each other in response to external signals. As shown in FIG. 1, a first end of the reconnection switch 30 may be connected to the battery 10 and a second end may be connected to the controller 100. In various embodiments of the present disclosure, when the reconnection switch 30 is turned on in response to an external input, the controller 100 connected with the second end of the reconnection switch 30 may recognize this, and the controller may then provide a control signal to the relay 20 for turning on the relay 20.

In an example embodiment of the present disclosure, the controller 10 may be operated by (i) the first regular transmitted power through a connection line between the battery 10 and the relay 20 and (ii) the second regular power transmitted through a connection line between the relay 20 and a load. Referring to FIG. 1, the first regular power is the power supplied to a power unit 120 of the controller 100 through the connection line between the battery 10 and the relay 20. Further, the second regular power is the power supplied to the power unit 120 of the controller 100 from a junction box 50 connected to the rear end of the relay 20.

In various embodiments of the present disclosure, the controller 100 may be a battery management system (BMS) controller for a vehicle. For instance, the controller 100 may be implemented by a battery management system that manages both a high-voltage battery and a low-voltage battery in an environment-friendly vehicle. The controller described in the specification and the accompanying drawings may commonly be referred to as a BMS.

Referring once again to FIG. 1, the controller 100 includes a wake-up input unit 110, a power unit 120, and a relay control unit 130.

The wake-up input unit 110 is a component for receiving a signal for waking up the controller 100. When the wake-up input unit 110 receives a signal for wake-up, the controller 100 supplies power to the components therein so that the components may begin normal operation. In an example, when the controller 100 is in a sleep state (e.g., when the engine of the vehicle is stopped), the controller is able to perform only minimal operations. However, in this sleep state, the controller 100 is unable to perform all of its normal control functions. For example, the controller 100 may be unable turn the relay 20 on and off in the sleep state. However, when the wake-up input unit 110 receives input for wake-up, the controller 100 supplies regular power to the components therein to start them.

The input unit 110 may receive a wake-up signal in various ways. For instance, the wake-up signal that is input to the wake-up input unit 110 may be input from the key of a vehicle, input from the reconnection switch 30, or overcharge at the rear end of the relay 20 provided by jump starting the vehicle. For example, when the wake-up input unit 110 receives key-input for ACC-on or IGI-on from a start key 61 of a vehicle, the wake-up input unit 110 can wake up the controller 100. Further, when the connection switch 30 is reconnected and voltage is applied to the wake-up input unit 100 through the reconnection switch 30, the wake-up input unit 110 can wake up the controller 100.

The power unit 120 is a component that is connected directly to the battery 10, receives the first regular power through the connection line between the battery 10 and the relay 20, and receives second regular power through the connection line between the relay 20 and loads. The power unit 120 stops in the sleep state, and the power unit 120 can start and supply power to all of the components of the controller 100 when a specific signal is input to the wake-up input unit 110. According to an embodiment of the present disclosure, because the power unit 120 directly receives regular power from the battery 10, wake-up is possible even when the relay 20 is turned off.

The relay control unit 130 provides to the relay 20 a control signal for controlling the electrical connection of the relay 20. As described above, for example, when a battery voltage detected by a voltage sensor (not shown) on the battery 10 is under a predetermined critical value, the relay control unit 130 may provide a control signal for turning off the relay 20. Further, when the reconnection switch 30 is turned on and battery voltage is input to the controller 100, the relay control unit 130 may provide a control signal for turning on the relay 20.

In an example embodiment, the relay control unit 120 provides pulse waveforms as the control signals for controlling the relay 20. That is, the relay control unit 120 turns the relay 20 on/off by controlling pulse waveforms. Accordingly, even if the reconnection switch 30 is turned on for a long time, it is possible to prevent damage to the coil in the reconnection switch 30.

Referring to FIG. 1, the battery management system may also include junction box 50 for making electrical connection between the relay 20 and one or more electrical loads 63. The battery management system may further include a low-voltage DC-DC converter (LDC) 62. The system may also include one or more electric loads 63 that are operated by low-voltage power from the battery 10 or the LDC 62.

In the battery management system according to the present disclosure, the controller 100 is configured to receive power transmitted from a first connection line and power transmitted from a second connection line different than the first connection line. More particularly, as described above with reference to FIG. 1, the controller 10 receives (i) the first regular power through the connection line between the battery 10 and the relay 20 and (ii) the second regular power through the connection line between the relay 20 and loads. The first regular power and the second regular power are provided to the power unit 120 of the controller 100.

Although the first regular power and the second regular power are provided to the controller 100 or the power unit 120 through specific supply lines in FIG. 1, is should be understood that this is an example configuration, and the first regular power and the second regular power can be provided in various ways.

Figure 2:
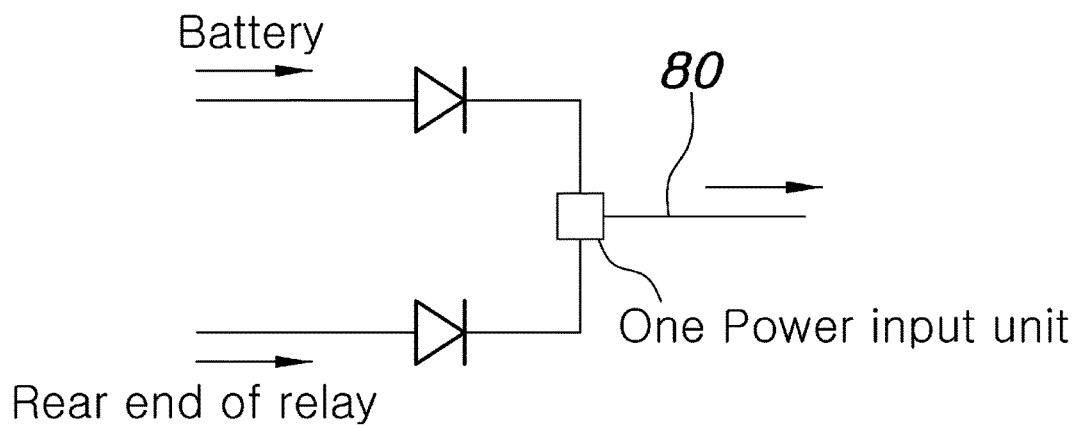
FIGS. 2 and 3 are views showing examples of supply of first regular power and second regular power in a battery management system for a vehicle according to an example embodiment of the present disclosure.
Figure 3:
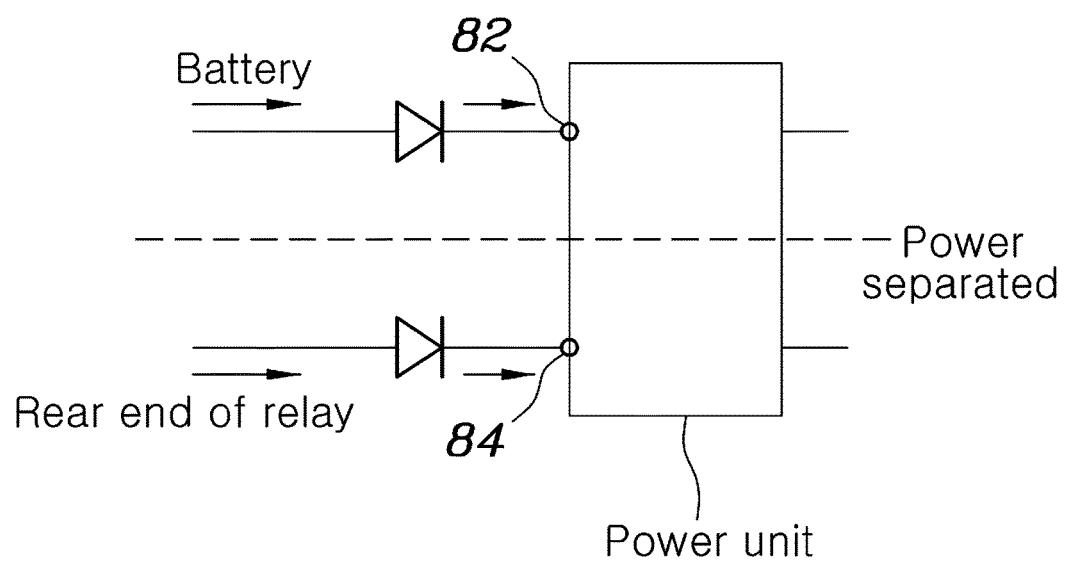

FIGS. 2 and 3 are views showing examples of supply of a first regular power and a second regular power in a battery management system for a vehicle according to an example embodiment of the present disclosure.

First, as shown in FIG. 2, the first regular power provided from the battery 10 and the second regular power provided from the rear end of the relay 20 may both be provided to the power unit 120 of the controller 100 through a common supply line 80. Therefore, the first regular power and the second regular power may be provided to one power input unit on a controller implemented in an integrated circuit chip. This type of supply of both the first and second regular powers can simplify a circuit, because the power supply can be achieved with only one power terminal of a controller. This common supply line may thus help to reduce the controller size, controller weight, and controller manufacturing costs.

Alternatively, as shown in FIG. 3, the first regular power provided from the battery 10 and the second regular power provided from the rear end of the relay 20 may be separately provided to the power unit 120 of the controller 100 through separate supply lines. Referring to FIG. 3, two separate power input terminals 82, 84 are provided for the controller implemented in an integrated circuit chip. Although the size, weight, and manufacturing cost of a controller with two separate power input terminals may be greater than for a controller with a single power input terminal, the controller with two power input terminals can stably operate even if there is a large voltage difference between the front end and the rear end of the relay 20.

As shown in the examples of FIGS. 2 and 3, one or more diodes are provided so as to prevent a countercurrent.

As described above, according to an example embodiment of the present disclosure, a controller for controlling a battery management system is configured to receive a first power from a first connection line and a second power from a second connection line. Accordingly, even if the battery 10 is discharged below a predetermined level with the relay 20 turned off and the controller 20 cannot be operated by the first regular power, the controller 100 can be operated by the second regular power. This second regular power may, for instance, be provided by external power provided by a jump start to the connection line between the relay 20 and electric loads. Accordingly, the controller 100 can be operated by the external power, so a jump start of the vehicle is possible. Further, when the reconnection switch 30 is connected, the controller 100 can recognize this situation and turn on the relay 20.

Figure 4:
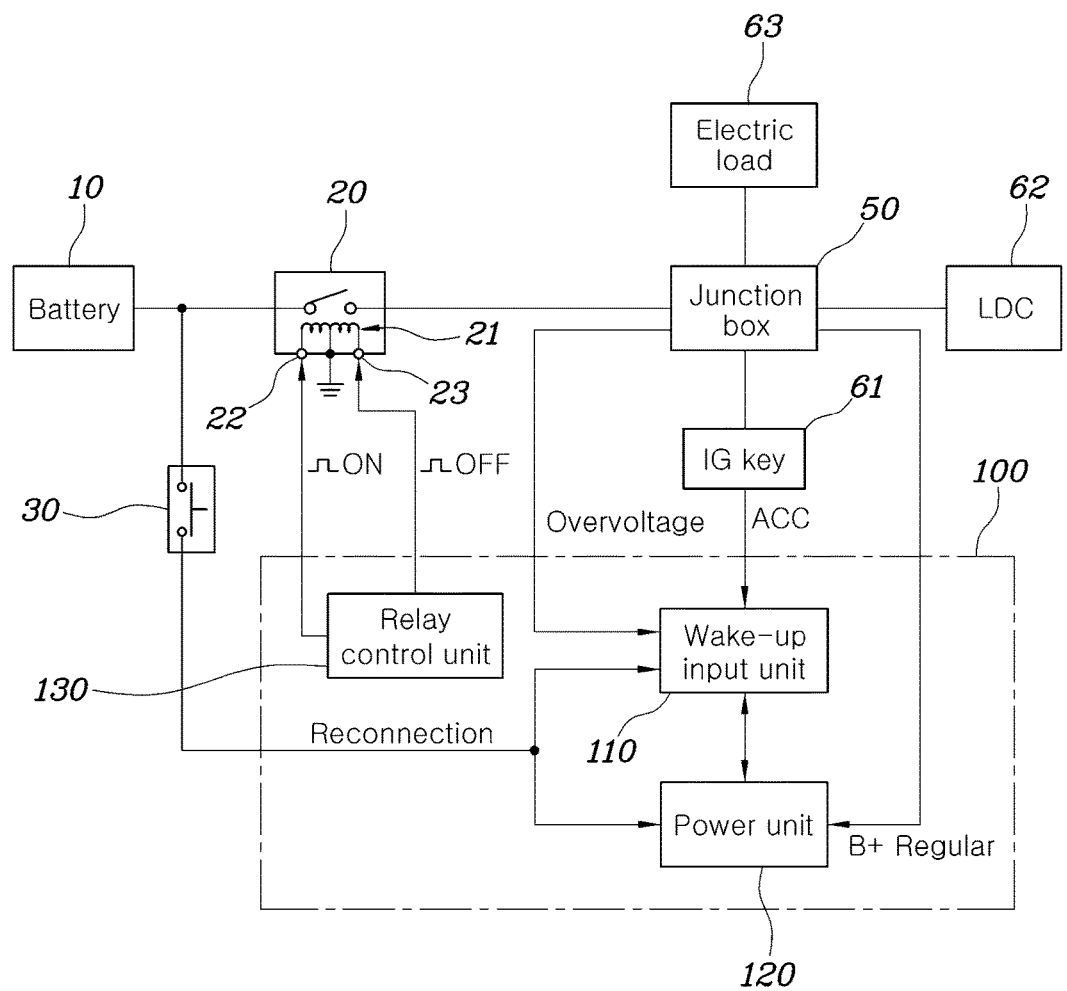
FIG. 4 is a block diagram illustrating a battery management system for a vehicle according to an example embodiment of the present disclosure.

FIG. 4 is a block diagram illustrating an example battery management system for a vehicle according to another example embodiment of the present disclosure.

Referring to FIG. 4, in this example, the first regular power is applied to the controller 100 only when the reconnection switch 30 is connected. To this end, the first end of the reconnection switch 30 may be connected to the connection line between the battery 10 and the relay 20, and the second end of the reconnection switch 30 may be connected to both the wake-up input unit 110 and the power unit 120 of the controller 100.

In this example embodiment, when the reconnection switch 30 is connected with the relay 20 turned off and the voltage of the battery 100 is over a predetermined level, the wake-up input unit 110 of the controller 100 wakes up the controller 100 by receiving the voltage of the battery 10 through the reconnection switch 30, and the power unit 120 operates the relay control unit 130 by receiving the voltage of the battery 10 as the first regular power while the reconnection switch 30 remains in the connection state so that it is possible to turn on the relay 20.

Further, when the relay 20 is turned on and the reconnection switch 30 is disconnected, the controller 100 can keep operating normally by receiving the second regular power through the connection line between the rear end of the relay 20 and electric loads.

As described above, according to example embodiments of the present disclosure, a controller receives power from both the front end and the rear end of a relay. Due to this arrangement, even if the battery is discharged to a level at which the controller cannot be operated, the controller can be operated by regular power from external power connected to the rear end of the relay to jumpstart the vehicle.

Therefore, according to example embodiments of the present disclosure, it is not only possible to prevent battery overcharge and over-discharge by controlling a relay, it is also possible to always perform a jump start of a vehicle using external power even when the battery is over-discharged. The disclosed battery management system may thus improve the commercial value of the vehicle.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A battery management system for a vehicle, the system comprising:
   a relay configured to electrically connect and disconnect power that is supplied from a battery to at least one load;
   a controller comprising a wake-up input unit and a power unit, wherein the controller is configured to receive (i) a first regular power transmitted from a connection line between the battery and the relay and (ii) a second regular power transmitted from a connection line between the relay and the at least one load, and wherein the controller is further configured to control an electrical connection state of the relay by providing control signals to the relay for turning the relay on and off; and
   a reconnection switch configured to wake up the controller, wherein a connection state of the reconnection switch is determined by an input provided by a user,
   wherein the controller is further configured to wake up in response to receiving a connection signal of the reconnection switch,
   wherein a first end of the reconnection switch is connected a connection line between the battery and the relay and a second end of the reconnection switch is connected to both the wake-up input unit and the power unit of the controller,
   wherein the first regular power is provided to the controller when the connection state of the reconnection switch is on, and
   wherein the first regular power is not provided to the controller when the connection state of the reconnection switch is off.

2. The system of claim 1, wherein the controller receives the first regular power when the reconnection switch is connected, and wherein the controller receives the second regular power when the reconnection switch is disconnected.

3. The system of claim 1, wherein the controller is further configured to wake up in response to receiving an accessory-on signal or an ignition-on signal provided in response to input of a key in a vehicle, or when an overvoltage is applied to the connection line between the relay and the at least one load.

4. The system of claim 3, wherein the controller is configured to (i) wake up when a voltage of the battery transmitted through the reconnection switch and then (ii) turn on the relay by receiving the voltage of the battery as the first regular power while the reconnection switch remains in the connection state, when the relay is turned off, a voltage of the battery is over a predetermined level and the reconnection switch is connected.

5. The system of claim 4, wherein the controller is operated by the second regular power when the relay is turned on and the reconnection switch is disconnected.

* * * * *